(12) United States Patent
Witt

(10) Patent No.: US 12,240,114 B2
(45) Date of Patent: Mar. 4, 2025

(54) OPTIMIZING AN AUTOMATED PROCESS TO SELECT AND GRIP AN OBJECT VIA A ROBOT

(71) Applicant: Siemens Aktiengesellschaft, Munich (DE)

(72) Inventor: Mathias Witt, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 818 days.

(21) Appl. No.: 16/130,444

(22) Filed: Sep. 13, 2018

(65) Prior Publication Data

US 2019/0084153 A1 Mar. 21, 2019

(30) Foreign Application Priority Data

Sep. 15, 2017 (EP) .................................. 17191304

(51) Int. Cl.
*B25J 9/16* (2006.01)
*G05B 19/418* (2006.01)

(52) U.S. Cl.
CPC ............. *B25J 9/1612* (2013.01); *B25J 9/163* (2013.01); *B25J 9/1679* (2013.01);
(Continued)

(58) Field of Classification Search
CPC ........ B25J 9/1612; B25J 9/163; B25J 9/1679; B25J 9/161; G05B 19/4183; G05B 19/41865; G05B 19/4189; G05B 2219/39102; G05B 2219/40007; G05B 2219/40053; G05B 2219/40499
(Continued)

(56) References Cited

U.S. PATENT DOCUMENTS 10,089,575 B1 * 10/2018 Redmon .................. G06N 3/08
2012/0165972 A1 * 6/2012 Wappling ............... B25J 9/1687
700/213

(Continued)

FOREIGN PATENT DOCUMENTS

CN 106393102 2/2017
DE 102016009030 2/2017
(Continued)

OTHER PUBLICATIONS

EP Search Report based on EP Patent No. 17191304.9 dated Mar. 19, 2018.
(Continued)

*Primary Examiner* — Jonathan L Sample
(74) *Attorney, Agent, or Firm* — COZEN O'CONNOR

(57) ABSTRACT

A method for optimizing an automated process to select and grip an object by a robot in an arrangement that includes a plurality of robots with regard to a specifiable optimization criterion, wherein the objects to be potentially gripped irregularly occur with respect to their spatial position and a time of their arrival, where detection of objects to be potentially gripped by robots is performed, detection of a priority characteristic as well as an assignment to one of the robots for the objects to be potentially gripped via an automated learning algorithm, taking the optimization criterion into account, and where selection and gripping depending on the assignment and the priority characteristic is implemented.

19 Claims, 2 Drawing Sheets

(52) U.S. Cl.
CPC ............... *G05B 19/4183* (2013.01); *G05B 19/41865* (2013.01); *G05B 19/4189* (2013.01); *G05B 2219/39102* (2013.01); *G05B 2219/40007* (2013.01); *G05B 2219/40053* (2013.01); *G05B 2219/40499* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 2017/0028562 A1* | 2/2017 | Yamazaki | ............ | B25J 9/1697 |
| 2017/0144301 A1 | 5/2017 | Washizu et al. | | |
| 2017/0225330 A1* | 8/2017 | Wagner | ............ | B25J 9/1694 |
| 2017/0252922 A1* | 9/2017 | Levine | ............ | G06N 3/084 |
| 2017/0252924 A1* | 9/2017 | Vijayanarasimhan | ............ | G05B 13/027 |
| 2018/0050451 A1* | 2/2018 | Takanishi | ............ | B25J 9/1697 |
| 2018/0089589 A1* | 3/2018 | Ooba | ............ | G05B 19/4182 |
| 2018/0281181 A1* | 10/2018 | Ooba | ............ | B25J 9/163 |
| 2019/0369600 A1* | 12/2019 | Lager | ............ | G05B 19/4182 |

FOREIGN PATENT DOCUMENTS

| | | |
|---|---|---|
| DE | 102016013731 | 5/2017 |
| EP | 2537645 | 12/2012 |
| EP | 2876066 | 5/2015 |

OTHER PUBLICATIONS

Office Action dated May 17, 2021 issued in Chinese Patent Application No. 201810730467.X.

* cited by examiner

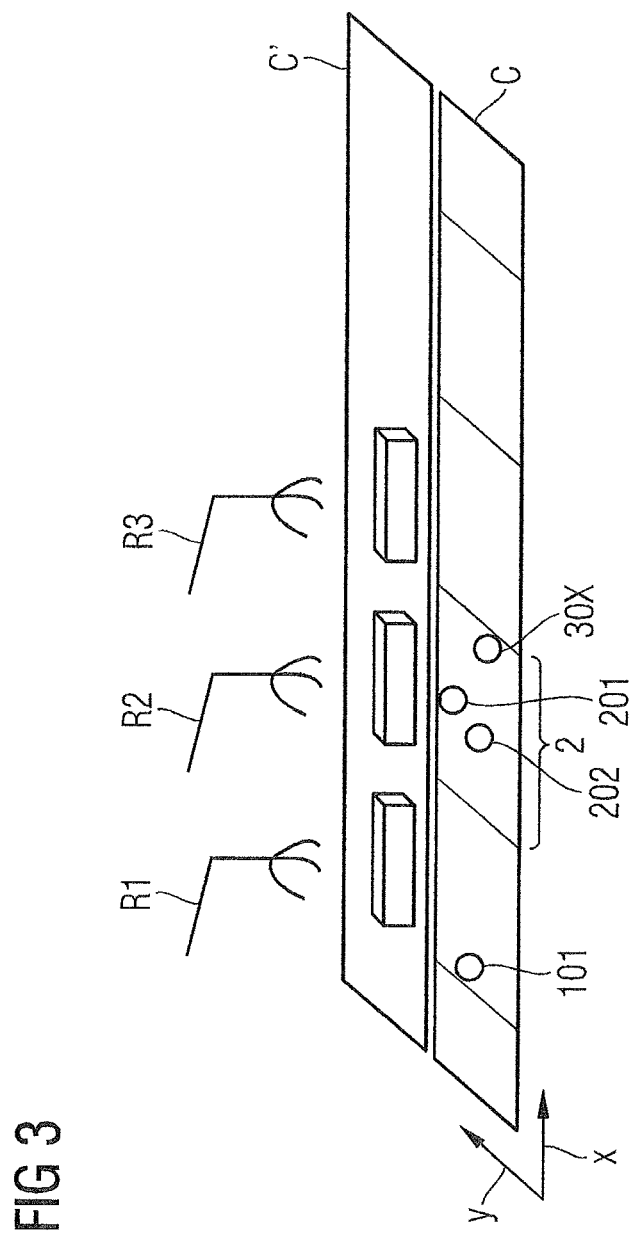

OPTIMIZING AN AUTOMATED PROCESS TO SELECT AND GRIP AN OBJECT VIA A ROBOT

BACKGROUND OF THE INVENTION

1. Field of the Invention

The invention relates to a method to optimize an automated process to select and grip an object via a robot under the use of an automated learning algorithm.

2. Description of the Related Art

Manufacturing equipment or packaging plants often have conveyor belts in different sectors of industrial automation, upon which objects or products or parts of products are situated in an unsorted or irregular manner. For example, above all, in the primary and secondary packaging sector, such as in the foodstuffs, drinks and tobacco industry, central conveyor belts can be frequently found, upon which products to package are situated. Thereby, the number and arrangement of the products varies for each conveying surface. For a packaging process, one or a plurality of industrial robots, i.e., delta pickers or articulated robots, are thus often used in a row to perform a "pick-and-place". Under this, the specific gripping of objects and their placement at another location, for example, in a packaging box, is understood. In order to detect the "pick positions" of the products on the conveyor belt, sensors are used, such as camera systems.

Due to the varying number of products on the conveyor belt, this often results in downtimes or unproductive phases of individual robots. The robots act according to the first-in-first-out principle, where the prioritizing of a product to be picked up simply occurs based on a position detected in a dimension on the conveyor belt. That means that the objects are analyzed with regard to their position on the conveyor belt in the direction of the running direction of the belt. The further the product is located on the belt in the conveying direction, the higher the priority. The product with the highest priority, which is in the working range of a robot, is picked up or gripped.

SUMMARY OF THE INVENTION

With the foregoing in mind, it is therefore an object of the present invention to provide a method, a related computer-program product and a production machine for the operation and control of a robot to optimize an automated process to select and grip an object via a robot in an arrangement consisting of a plurality of robots, which take a specifiable optimization criterion into account.

This and other objects and advantages are achieved in accordance with the invention by a method for optimizing an automated process to select and grip an object via a robot in an arrangement consisting of a plurality of robots with regard to a specifiable optimization criterion, where the objects to be potentially gripped irregularly occur with respect to their spatial position and a time of their arrival where the method comprises detecting the objects to be potentially gripped by the robots, detecting a priority characteristic as well as an assignment to one of the robots for the objects to be potentially gripped via an automated learning algorithm, taking the optimization criterion into account; and selecting and gripping the objects depending on the assignment and the priority characteristic.

In the present application, under a robot, a machine is understood, which can perform automated movement sequences in a controlled or regulated manner. Alternative terms include manipulator and an automated moving device with a plurality of axes.

Under an arrangement consisting of a plurality of robots, a system is understood, in which a plurality of robots have a defined relationship to one another. For example, a spatial proximity or a joint control of the various robots is provided within a system or communication relationships are available among the robots so that a decentralized coordination of the robots among one another is possible.

The objects to be gripped occur irregularly with regard to their location or position, or spatial arrangement and a time of their arrival. That means that it is not predicted and, in particular, it cannot be predicted at what time objects occur at what position within the working range of the robots.

The detection of those objects that can be potentially gripped by the robots occurs in such a way, for example, that at a specified point in time and, in particular, repeatedly as specified points in time, all of the objects to be gripped by the plurality of robots of the system are detected. In an embodiment, the objects to be potentially gripped are detected for each robot separately.

The detection of a respective priority characteristic as well as an assignment to one of the robots for each of the objects to be potentially gripped occurs via an automated learning algorithm. Thereby, the automated learning algorithm is established in such a way that it takes the optimization criterion into account when determining the priority characteristic and the assignment. Thereby, the capacity of the various robots of the arrangement is included in the calculation. In the process, the priority characteristic regulates the priority of those objects that were assigned together to a robot. In turn, the assignment is not detected based on the position of the objects with regard to the working range of the various robots alone, but is the result of the automated learning algorithm which, in addition to the position of an object itself, also takes the positions of the other objects, as well as the other objects within the working range of other robots and the possible gripping processes of the other robots, as well as the optimization criterion into account. Only via the automated learning algorithm and via the possibility of being able to specify the optimization criterion to this algorithm is the possibility created to coordinate the selection and gripping of the various robots with one another in an optimized manner.

In accordance with another embodiment, the objects are moved on a conveyor belt at a conveyor-belt speed. For example, thereby, the conveyor belt causes a linear movement of the objects situated on it. For example, the conveyor belt is provided to transport objects from a processing station to a packaging station. In the case of a conveyor belt at a constant speed, taking the movement of the objects on the conveyor belt into account over time in a simple way is possible since, in particular, the distances of the objects to one another do not change. The movement of objects of more complex conveyor systems can be taken into account by the control system of the conveyor system, for example, linear motors that make a separate control of individual conveyor sections possible, being connected to the control system of the robots in a communicative manner.

In accordance with an embodiment, a monitored learning algorithm or a reinforcing learning algorithm, in particular, based on an artificial neural network, is used as an automated learning algorithm. For example, during a training phase, output data of a pick-and-place process, which is seen as being optimal, is trained into a monitored learning algorithm. For example, an algorithm that is based on an artificial neural network offers the possibility to adapt the output to the desired result by weighting the various nodes within the network.

In accordance with a further embodiment, an instance-based learning algorithm is used as an automated learning algorithm. Instance-based learning algorithms are also referred to as memory-based learning algorithms and work using a database, where a given scenario is compared to entries of this database and, based on results that are also stored in the database and are seen as being optimal, related assignments and priority characteristics are allocated.

In accordance with yet another embodiment, energy consumption is minimized via the optimization criterion. As a result, the selection and gripping can be selected by the algorithm such that the robots or the gripper arms of the robots have to move along the shortest trajectories possible or these movement sequences can be run with the lowest trajectory speed possible. If, for example, a packing process allows a slowdown of the packaging process due to the energy consumption optimization, for example, at times where the objects from the previous production step have to be waited for in any case, in this way, the energy consumption and thereby, the costs can be reduced in a favorable manner.

In accordance with an embodiment, the automated learning algorithm is trained such that a trajectory speed of the robots is minimized and, at the same time, a maximum of the potentially seizable objects are gripped by the robots. Accordingly, the automated process to select and grip an object then occurs such that just the right trajectory speed for each robot is also output. For this, the trajectory speed of a robot is designed to be adaptable accordingly. In a favorable way, the momentary and power consumption of the electric drives sink/fall at a reduced trajectory speed. This also protects the mechanics and reduces heavy burdening of the gearing, which is for example especially high in the case of delta pickers, due to the strong level of backlash.

Depending on the configuration of the objects on the conveyor belt at hand, the optimized process entails that objects that can still be potentially gripped by a first robot are not picked up by this, but are let by and these are, for example, then picked up by the subsequent robot because the trajectory speed of the first robot can be reduced in this manner.

If a product cannot be picked up during a learning phase before it is outside of the working range of the arrangement of robots, the attempt is deemed to have failed and the learning algorithm, for example, an artificial neural network, must be adapted such that the speed of individual robots or all robots is increased in the case of the same input data.

In accordance with another embodiment, throughput is maximized via the optimization criterion. If the variable to be optimized is the throughput, meaning the quantity of the picks performed per unit of time, an efficiency of the pick-and-place system can be increased in this manner, at least under the assumption that objects can arrive into the working range of the robot arrangement correspondingly quickly, for example, due to higher pick-up rates of the conveyor belt from a previous step in a packaging system or via an increased conveyor-belt speed.

In accordance with a further embodiment, the automated learning algorithm is trained such that downtimes of the robots are minimized and, at the same time, a maximum of the potentially seizable objects are gripped by the robots. Depending on the configuration of the objects on the conveyor belt at hand, the optimized process entails that objects that can still be potentially gripped by a first robot are not picked up by this, but are let by and these are, for example, then picked up by the subsequent robot because all the robots can grip more objects overall in this manner and the overall throughput is increased.

For example, a weighting within an artificial neural network for a given input combination consisting of objects is adapted with regard to a maximum achievable throughput. If an object cannot be picked up by any of the robots, then the attempt is considered to have failed and the speed of individual or all robots must be increased or the speed of a conveyor belt must be reduced.

In accordance with another embodiment, the automated learning algorithm is furthermore trained such that a variably adjustable conveyor-belt speed is maximized. If the speed of the conveyor belt is adjustable, this can also be optimized via the output, for example, of an artificial neural network, so that the throughput is furthermore increased, thereby furthermore all objects are picked up.

In accordance with a still further embodiment, the detection of the objects to be potentially gripped occurs with the aid of sensors, in particular, with the aid of one or a plurality of cameras. For example, at settable trigger times, the objects on a conveyor belt and their spatial distribution are detected via the sensors. In particular, the detection occurs in cycle times of a few hundred milliseconds.

In an embodiment, the teaching of the automated learning algorithm is performed during a learning phase and via real objects. For example, an artificial neural network is trained in which failed attempts are characterized as such and the network is changed by weighting such that faulty results are prevented.

In another embodiment, the training of the automated learning algorithm is performed during a learning phase via a simulation of the objects. For example, the algorithm obtains a simulated camera image as an input.

The input for, for example, an artificial neural network is therefore a list of objects to be picked up, for example, a list of products on a conveyor belt with x- and y-coordinates. This list is generated from a real or a simulated camera system. The automated learning algorithm or, for example, the artificial neural network generates the prioritization and assignment of the objects to individual robots as an output. The individual robots select the object inside of their working range, which has an assignment to the respective robot, and grip this, where assigned objects are accepted with the highest priority as the first one and the other objects are selected with descending priority.

In the present application is understood under the highest priority that an object as the first one should be gripped. A realization, where, for example, a value of the priority characteristic is low if the object should be gripped early on, is also contained in the scope of protection of the present application.

It is also an object of the invention to provide a non-transitory computer-program product with a computer program, which has means to carry out the above-mentioned method if the computer program is executed on a program-controlled device, in particular a motion-control unit.

A computer-program product, for example, a computer-program means, can, for example, be provided as a storage medium, such as a memory card, USB stick, CD-ROM, DVD, or also in the form of a downloadable file from a server in a network. For example, this can occur in a wireless communication network by means of transmission of a related file using the computer-program product or the computer-program means. In particular, a processor or a microprocessor comes into question as a program-controlled device, for example, on a memory-programmable control system.

It is also an object of the invention to provide a production machine, in particular, a packaging machine, having a motion-control system to control the motion of robots, where the motion-control system implements the disclosed embodiments of the method in accordance with the invention.

In the case of existing hardware of a manufacturing or packaging system, the system throughput can be increased by optimizing the pick strategy using automated learning algorithms. By minimizing the robot downtimes at a maximum trajectory speed, a system can be operated with the maximum possible output. At the same time, particularly in the case of limiting the provision of objects in a previous production step, energy can be saved during ongoing operation if the trajectory speed of individual robots is minimized with a constant throughput.

At a specific packaging system, trained or taught automated learning algorithms can also be used for use on another system. For example, only an adaptation or another optimization is necessary and already the results from the learning phase at the specific system can be fallen back upon.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention will be explained in more detail based on exemplary embodiments with the aid of the figures, in which:

FIG. 3 is a schematic representation of a pick-and-place process in a packaging system with a conveyor belt in accordance with another exemplary embodiment of the invention.

DETAILED DESCRIPTION OF THE EXEMPLARY EMBODIMENTS

In the figures, elements with an identical function are provided with the same reference numbers, provided nothing else is indicated.

Figure 1:
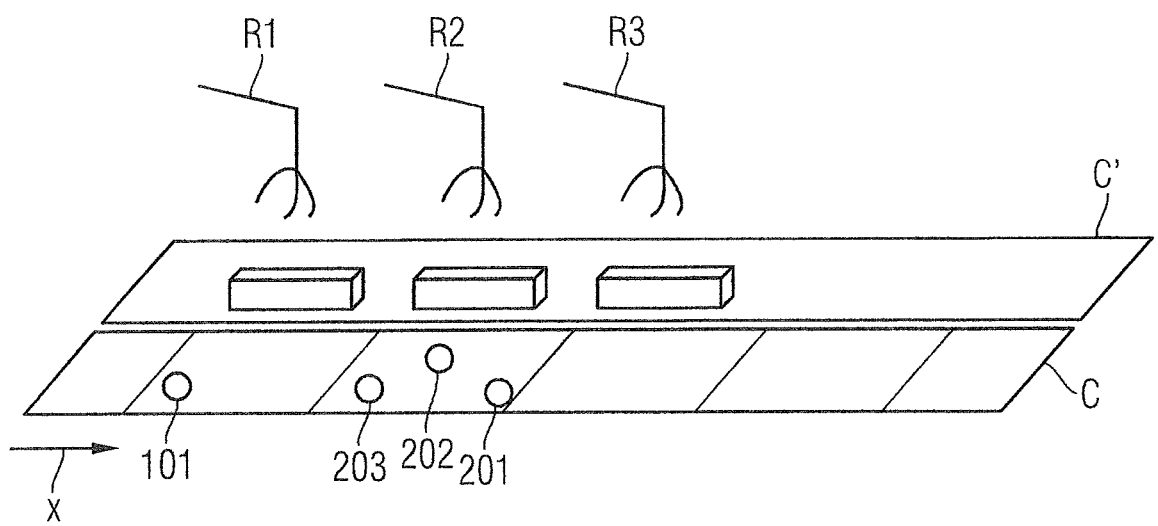
FIG. 1 is a schematic representation of a pick-and-place process on a conveyor belt in accordance with the prior art.

In FIG. 1, it is schematically shown how objects 101, 203, 202, 201 are arranged on a conveyor belt C. For example, it has to do with individual products packaged with a plastic foil in a packaging system, which are ready for stacking in a box. For example, six of the individual products are packaged in a box respectively and thus delivered as goods. For this, the objects 101, 203, 202, 201 are taken by robot gripper arms R1, R2, R3 from conveyor belt C and lifted into boxes on another conveyor belt C'. For reasons of clarity, relatively few objects are shown.

In real packaging systems, objects occur on the conveyor belt C in an irregular and uncontrolled manner. For example, they fall down from a conveyor belt previously located in the production system. For example, during the last processing step, a plastic foil was wrapped around a product and the finished product should be packed on conveyor belt C into the boxes. In the prior art, only an X-position of the objects detected by a camera is taken into consideration. In the case of the X-axis, it has to do with the axis specified by the conveyor-belt-speed direction. Therefore, values of the X-position of an object become larger, the further they are located in the running direction of the conveyor belt.

Each robot R1, R2, R3 has a working range and selects the objects in the sequence of their priority from the products from its working range that are taken into account under the consideration of the belt speed and an achievable pick-up point by the respective robot. Thereby, the object that is located the furthest in the X-direction has the highest priority and is gripped first; the following objects are gripped in decreasing order in accordance with their respective priority. Thereby, the axes of the robots are respectively controlled according to a first-in-first-out principle, according to which the first object detected in the working range is also taken as the first object to be packed in the box. Thus, each robot only acts within its working range and a coordination of the robots among one another does not occur.

Figure 2:
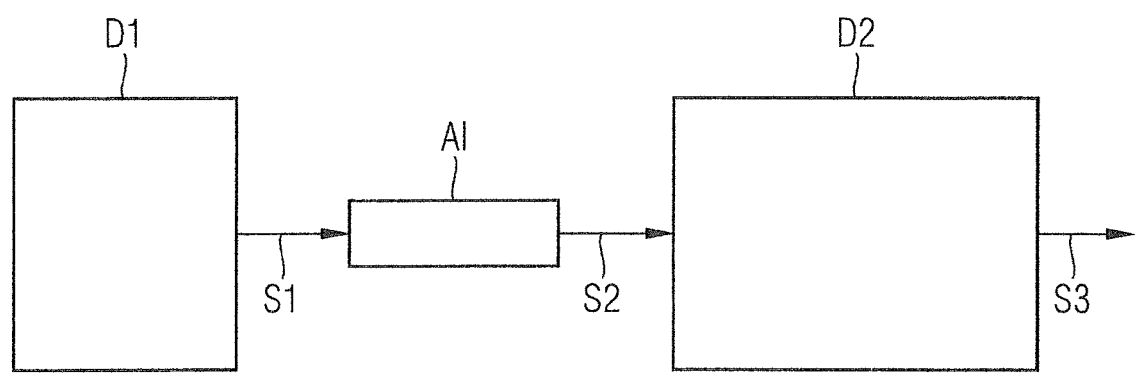
FIG. 2 is a schematic representation of the method in accordance with a first exemplary embodiment of the invention.

FIG. 2 visualizes input data D1 and output data D2 of an automated learning algorithm AI, as it is used in the method in accordance with a first exemplary embodiment of the invention. Thereby, the field of application should be the same as the one described in FIG. 1, i.e., the packing of objects in boxes and picking up objects from a conveyor belt by robot gripper arms. Often, the general term artificial intelligence is used to refer to methods that work with automated learning algorithms. In accordance with a first exemplary embodiment of the invention, the input data D1 is, for example, formed by listing all of the objects detected by a sensor or a camera and their related spatial position.

For example, for a conveyor belt, only a two-dimensional representation of the spatial position is required because all objects are located on a horizontal level at a constant distance in a Z-direction from the respective robot gripper arms. For example, an X- and a Y-position are detected, whereby a direction in the running direction (x) of a conveyor belt as well as in the horizontal perpendicular to it (y) is understood. From such a list, at a first step S1, it is detected which objects can be potentially gripped by the robots. Thereby, in particular, all robot gripper arms and all of the objects that can be gripped by them are understood.

At a second step S2, the automated learning algorithm AI now determines a priority characteristic as well as an assignment to one of the robots respectively for all objects that can be potentially gripped, taking the optimization criterion into account. As an output D2 or a result, it provides a list of the objects with an assignment to the robot in accordance with the optimization criterion as well as a priority. For example, this is based on an instance-based learning algorithm. In order for the instance-based learning algorithm to be able to implement the optimization criterion, it can access a database. The algorithm categorizes the information on the current situation on the conveyor belt collected with the help of the sensor and attempts to find just the right database entry. Scenarios of objects on a conveyor belt and suggested, ideally optimized, solutions to grip the objects are stored in the database. The more similar a current given situation is to a situation already stored in the database, the better the suggested solution can be used and the better an optimization criterion is fulfilled. For example, the algorithm can change the optimization requirement at any time and, depending on the selected optimization criterion, it can access various databases, which provide solutions taking the respective optimization criteria into account.

Optionally, the output data D2 contain the raw data or input data D1, which were provided to the learning algorithm. The output data D2 allow a motion-control system to transmit commands to be output for the various axes to be controlled. Based on the assignment and the priority characteristic, the selection and gripping occur at a third step S3 via the control system of the individual axes per robot.

FIG. 3 illustrates the method in accordance with the invention in a second exemplary embodiment for a pick-and-place application, as has already been described in the description of FIGS. 1 and 2. For this, a sensor system to detect the objects on the conveyor belt (not shown) is extended in order to be able to detect a second dimension. In this exemplary embodiment, the X- and Y-positions of the objects are detected. In addition to conveyor belt C, another conveyor belt C' is arranged, upon which boxes to be filled with the objects are situated.

An artificial neural network is used as an automated learning algorithm in accordance with the exemplary embodiment described in FIG. 3, which optimizes the entire packaging system in terms of energy consumption. The artificial neural network was previously trained with respect to this optimization criterion during a learning phase such that, during ongoing operation, output data is generated from the input data of a camera image, which comprises the objects with their X- and Y-position, this output data indicate an assignment to one of the robot gripper arms R1, R2, R3 for each object, as well as a prioritization that must be adhered to by the assigned robot.

For example, the working range 2 of robot gripper arm R2 is shown in FIG. 3, in which 3 objects are located. Although the object 30X on the X-axis has advanced the furthest in the direction of the conveyor-belt-movement direction and is located within the working range of robot gripper arm R2 so that it could potentially pick it up, it has been assigned to robot gripper arm R3 by the artificial neural network. Object 30X in the Y-direction has come to rest far from conveyor belt C'. As a result, it is more favorable to allow the gripping of object 30X to be performed by robot gripper arm R3. If, for example, robot gripper arm R2 were to want to pack all three of the objects coming to rest within working range 2, then robot gripper arm R2 would have to grip the three objects 201 and 202, 30X at very high speed, which is associated with high energy consumption. In the assignment of the objects to the robots, the artificial neural network can take into account that, for example, robot R3 has enough capacity to grip the object 30X as the object after the next, for example. All objects can be packed in this way and energy consumption is simultaneously reduced.

With the aid of the artificial neural network, it is possible to derive prognoses from learned parameters that make it possible for all objects to be picked up from a working range of a plurality of robots, thereby simultaneously being able to minimize energy consumption. In the present case, object 30X is assigned to robot gripper arm R3 right from the beginning so that robot gripper arm R2 can start earlier with the gripping of objects 201 and 202, thereby being able to set a lower trajectory speed.

An adaptation of the assignments and priorities favorably occurs at regular intervals, where, over time, a changed assignment or prioritization may also result. In this way, the automated learning algorithm can regularly take into account the current arrangement of the objects on the conveyor belt with the aid of the sensors and, in particular, changes due to falling over or other objects subsequently coming.

For purposes of simplicity, in the exemplary illustrated embodiment, only a small number of objects have been visualized and a possibility for optimization has only been described for a small number of objects. It is to be understood on its own, however, that the advantage and possibilities of an automated learning algorithm and especially an artificial neural network only emerge with a plurality of objects, a plurality of robot gripper arms and, where applicable, additionally along with high speeds.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for optimizing an automated process for selecting and gripping an object via a robot in an arrangement consisting of a plurality of robots with respect to a specifiable optimization criterion, the objects to be potentially gripped irregularly occurring with respect to their spatial position and a time of their arrival, the method comprising:
   detecting the objects to be potentially gripped by robots;
   detecting a priority characteristic which controls a priority of objects which were jointly assigned to the robot and detecting whether the objects to be potentially gripped are assigned to one of the robots via an automated learning algorithm, said detections taking into account the specifiable optimization criterion, and the automated learning algorithm taking into account a position of the object with respect to a respective operating range of the plurality of robots, positions of other objects, other objects in the operating range of the plurality of robots and possible gripping processes of the plurality of robots, and the specifiable optimization criterion; and
   selecting and gripping the object, depending on the assignment and the priority characteristic.

2. The method as claimed in claim 1, wherein the objects are moved on a conveyor belt with a conveyor-belt speed.

3. The method as claimed in claim 1, wherein a monitored learning algorithm or a reinforcing learning algorithm, based on an artificial neural network, is utilized as the automated learning algorithm.

4. The method as claimed in claim 2, wherein a monitored learning algorithm or a reinforcing learning algorithm, based on an artificial neural network, is utilized as the automated learning algorithm.

5. The method as claimed in claim 1, wherein an instance-based learning algorithm is utilized as the automated learning algorithm.

6. The method as claimed in claim 1, wherein energy consumption is minimized by the specifiable optimization criterion.

7. The method as claimed in claim 1, wherein the automated learning algorithm is trained such that a trajectory speed of the robots is minimized and, at the same time, a maximum of the potentially seizable objects are gripped by the robots.

8. The method as claimed in claim 1, wherein throughput of the objects is maximized by the specifiable optimization criterion.

9. The method as claimed in claim 8, wherein the automated learning algorithm is trained such that downtimes of the robots are minimized and, at the same time, a maximum of the potentially seizable objects are gripped by the robots.

10. The method as claimed in claim 8, wherein the automated learning algorithm is furthermore trained such that a variably adjustable conveyor-belt speed is maximized.

11. The method as claimed in claim 9, wherein the automated learning algorithm is furthermore trained such that a variably adjustable conveyor-belt speed is maximized.

12. The method as claimed in claim 1, wherein the detection of the objects to be potentially gripped occurs aided by sensors.

13. The method as claimed in claim 12, wherein the sensors comprise one camera or a plurality of cameras.

14. The method as claimed in claim 1, wherein the training of the automated learning algorithm is performed during a learning phase and via real objects.

15. The method as claimed in claim 1, wherein the training of the automated learning algorithm is performed during a learning phase via a simulation of the objects.

16. A non-transitory computer-program product encoded with a computer program which, when executed on a program-controlled device, causes optimization of an automated process for selecting and gripping an object via a robot in an arrangement consisting of a plurality of robots with respect to a specifiable optimization criterion, the objects to be potentially gripped irregularly occurring with respect to their spatial position and a time of their arrival, the computer program comprising:

program code for detecting the objects to be potentially gripped by robots;

program code for detecting a priority characteristic which controls a priority of objects which were jointly assigned to the robot and detecting whether the objects to be potentially gripped are assigned to one of the robots via an automated learning algorithm, said detections taking into account the specifiable optimization criterion, and the automated learning algorithm taking into account a position of the object with respect to a respective operating range of the plurality of robots, positions of other objects, other objects in the operating range of the plurality of robots and possible gripping processes of the plurality of robots, and the specifiable optimization criterion; and program code for selecting and gripping the object, depending on the assignment and the priority characteristic.

17. The non-transitory computer-program product as claimed in claim 16, wherein the program-controlled device comprises a motion-control unit.

18. A production machine comprising:

a motion-control system for controlling motion of robots, wherein the motion-control system is configured to:
  detect objects to be potentially gripped by robots;
  detect a priority characteristic which controls a priority of objects which were jointly assigned to the robot and detect whether the objects to be potentially gripped are assigned to a robot via an automated learning algorithm, said detections taking into account a specifiable optimization criterion, and the automated learning algorithm taking into account a position of the object with respect to a respective operating range of the plurality of robots, positions of other objects, other objects in the operating range of the plurality of robots and possible gripping processes of the plurality of robots, and the specifiable optimization criterion; and
  select and grip the object, depending on the assignment and the priority characteristic.

19. The production machine as claimed in claim 18, wherein the production machine comprises a packaging machine.

* * * * *